May 8, 1934. F. EICHELBERGER 1,957,764
METHOD OF INCREASING STRENGTH OF SALT SOLUTIONS
Filed June 30, 1933
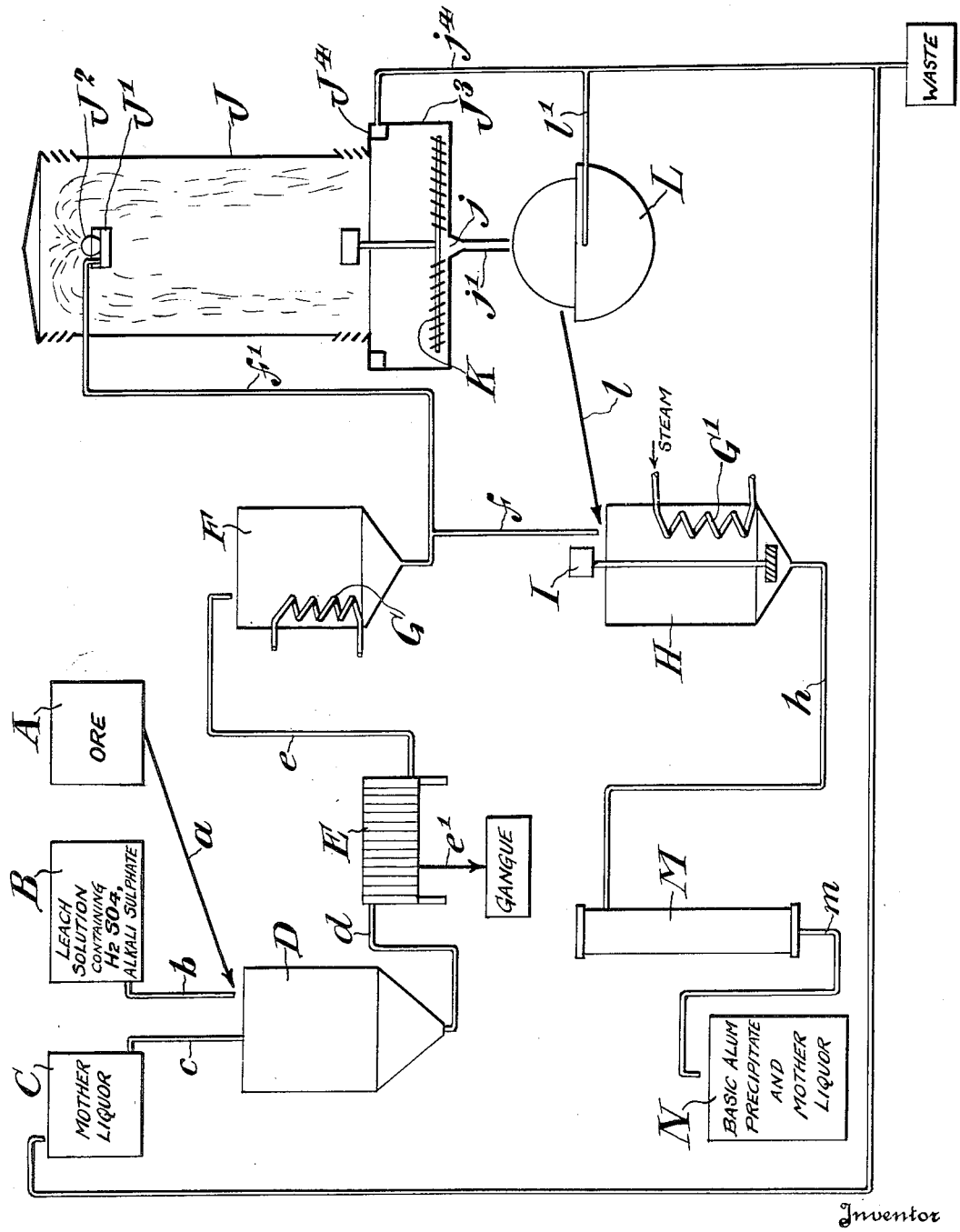
Inventor
Frank Eichelberger,
By Francis J. Pomeree
Attorney Patented May 8, 1934

1,957,764

UNITED STATES PATENT OFFICE 1,957,764

METHOD OF INCREASING STRENGTH OF SALT SOLUTIONS

Frank Eichelberger, New York, N. Y., assignor to Kalunite Company, Philadelphia, Pa., a corporation of Delaware Application June 30, 1933, Serial No. 678,417

5 Claims. (Cl. 23—118)

My invention relates to a treatment of salt solutions and has for its object to provide an efficient and relatively economical method of producing from a relatively weak salt solution a more concentrated or stronger solution of the salt; more particularly, the object of my invention is to provide for the concentration of solutions of a normal potassium and/or ammonium alum though in its broader features it is applicable to the treatment of solutions of other salts, characterized in that, like ammonium and potassium alums, solubility of the salt increases appreciably as the temperature of the solvent is increased. Furthermore, the solubility of the salts adapted for my process would be of the order of 25% or less by weight of the solution at 20° C. as, with more soluble salts, the recovery by crystallization would be insufficient to cause appreciable concentration of the solution by the use of my process.

Broadly speaking, my invention consists in dividing a relatively weak solution of the salt, the solubility of which increases with the temperature of the solvent and which solution is heated to a temperature above the saturation point of the salt, into two portions, cooling one of said divided portions to a temperature or temperatures below the saturation point of the salt to effect the crystallization of the salt, separating the crystallized salt from its mother liquor and dissolving said separated salt in the other portion of the relatively weak salt solution, the temperature of which would be maintained or raised to a point which will insure the complete solution of the salt crystals and thereby increasing the strength or concentration of the solution. It will be understood that the portion of the solution treated for the extraction therefrom of salt crystals should be cooled to a point which will insure the maximum economical elimination of the salt by crystallization.

My invention is of especial practical value as applied to the treatment of solutions of ammonium and/or potassium alums and as a step in the manufacture of basic alum from ores of alumina by the process in which an ore of alumina, treated if necessary to render its alumina content soluble in sulphuric acid, is treated with a solution of sulphuric acid to extract from the ore its alumina content in the form of a solution of aluminum sulphate which solution, either in the leaching of the ore or subsequently, is mixed with a solution of ammonium and/or potassium sulphate to form a solution of a normal alum which normal alum solution, after treatment to separate it from gangue matter and undesirable impurities, is heated to temperatures between 140° and 200° C. to bring about the formation and precipitation of a basic alum which, after separation from its mother liquor, may be treated in any desired manner for the production of various products or combinations. In the process briefly outlined above, the normal alum solution which, during the greater part of its preparation and handling is kept at a comparatively high temperature to prevent the formation of alum crystals, is less concentrated than is economically desirable for the final heat treatment to produce the basic alum, and my process, as stated above, is of particular value in raising the concentration of the solution to a degree most economical for use in the final step of the process, that is to say, to a concentration in excess of 50% alum, the concentration of the normal alum solution before my treatment being in the neighborhood of 35% alum.

The temperature of the alum solution after filtration will be in the neighborhood of 70° C. at which temperature the alum will be in solution and the divided portion of the solution from which the alum is to be crystallized and separated should be cooled to about 20° C., at which temperature a considerable quantity of the alum, say in the neighborhood of 80%, will be crystallized out from the solution and, after separation from its mother liquor, can be added to the other divided portion of the original alum solution to increase the alum concentration therein.

Example

Starting with 1538 parts of a 35% alum solution containing 1000 parts of water and 538.4 parts of potash alum, 52% of this solution, or 802 parts, is subjected to crystallization. From this portion there will be separated by crystallization 221 parts of potash alum and a mother liquor formed containing 59.7 parts of alum and 521.3 parts of water. The 221 parts of alum are then dissolved in the second operation of the original alum solution, the temperature of which, to insure complete solution of the alum, should be raised to about 90° C., forming a solution with a concentration of 50% alum.

To achieve a similar result by evaporating the entire dilute solution to form a 50% solution, it would be necessary to remove from the starting solution as given in the above example, 406 parts of water. The evaporation of this large amount of water entails an extra expense which is much greater than that involved in the practice of my process.

The mother liquor from which the alum crystals have been separated may have such values as exist in them recovered in any convenient way, preferably in the process involving the treatment of an ore as described, the weak alum solution or a portion of it is returned to the leaching system and, to avoid the building up of impurities in the solution, it is desirable that a certain portion of the mother liquor should, in the cyclical operation of the process, be separated and allowed to go to waste or have its values recovered in some other way.

My invention will perhaps be better understood as described in connection with the drawing which is a diagrammatic showing in the nature of a flow sheet of what I believe to be the most useful application of my improved process to practical use. In the drawing, A indicates a storage bin for an ore of aluminum which, in the case of certain ores, should be dehydrated to make its aluminum contents soluble in sulphuric acid. B indicates a storage tank which, as indicated, contains a solution of sulphuric acid and of an alkali metal or ammonium sulphate and C indicates a storage tank for a portion of the mother liquor from which alum has been crystallized. D indicates a leaching tank into which, as indicated, leads a conduit $a$ from the bin A, a conduit $b$ from the tank B and a conduit $c$ from the tank C. $d$ indicates a conduit from the tank D to separating and filtering mechanism indicated at E as a filter press. $e$ indicates a conduit from the filter E for the clear filtrate feeding into a storage tank F. $e^1$ indicates the discharge of the filter by which filter cake or gangue is removed. It will be understood that the alum solution must be maintained at a sufficiently high temperature to insure the solution of its alum content and I have indicated in the storage tank F the presence of heating coils indicated at G. From the tank F the hot alum solution is drawn into divided portions, one portion passing through a conduit $f$ to a dissolving tank H which is indicated as provided with a heating coil $G^1$ and an agitator indicated at I. The other divided portion of the hot alum solution is shown as passing through a conduit $f^1$ to a cooling tower indicated at J which may be of any desired construction. As shown, the alum solution is delivered directly into a pan $J^1$ above which is located a revolving drum, the lower portion of which extends into the pan and which is indicated at $J^2$. This drum effects the spraying of the solution throughout the upper portion of the tower, the greater part of the sprayed solution falling through the tower into a tank $J^3$ at the bottom the tower. It will be understood that a current of air is passing upward through the tower while the drops of solution are falling, the result being to cool the solution and to carry away as vapor a certain percentage of the water content of the solution. The cooling of the solution in the tower results in the crystallization of a portion of its alum content, a result which is, of course, facilitated by the escape and vaporization of a portion of its water and the crystallized alum, which accumulates in the bottom of the tank $J^3$, is, as shown, drawn off by revolving rakes, indicated at K, to a delivery passage $j$, passing through a conduit $j^1$ to a filter indicated at L from which the crystals freed from their mother liquor are passed, as indicated at $l$, to the solution tank H, in which they are dissolved in the alum solution contained therein, which is thereby brought up to the desired degree of concentration. The concentrated alum solution is, as shown, delivered by a conduit $h$ to an autoclave indicated at M in which it is heated under pressure to a reactive temperature, in practice between 140° and 200° C., to effect the formation and precipitation of a basic alum and the production of a mother liquor containing sulphuric acid, alkali metal sulphate and a portion of undecomposed alum. The basic alum and acid mother liquor are indicated as passing from the autoclave M through a conduit $n$ to a tank N, to be disposed of in accordance with the particular end product desired.

The mother liquor from which the alum has been separated in the tank $J^3$ is mainly drawn off through a launder $J^4$ and pipe $j^4$ into which also leads a conduit $l^1$ from the filter L, passing, as shown, partly to waste, as indicated at O, and partly into the tank C from which it passes to the leaching tank. The amount of this mother liquor which goes to waste should be such as to avoid the accumulation of impurities in the liquors passing through the system, for example, where high grade alunite is used as a starting material it is advisable to draw off to waste approximately six percent of the mother liquor.

Having now described my invention, what I claim as new and desire to secure by Letters Patent, is:

1. The method of preparing from a relatively weak solution of a crystallizable salt, the solubility of which increases with increasing temperature, and with maximum solubility of 25% by weight of the solution at ordinary temperatures, which solution is initially of a temperature above the saturation point of the salt, a more concentrated solution thereof, which consists in dividing the weak solution into two portions, lowering the temperature of one of said divided portions to a point below the saturation point to effect the crystallization of a portion of the salt in solution therein and its separation from the mother liquor and then dissolving the salt crystals so obtained in the other divided portion of the relatively weak solution to obtain a stronger solution of the salt.

2. The method of preparing from a relatively weak solution of a crystallizable salt, the solubility of which increases with increasing temperature, and with maximum solubility of 25% by weight of the solution at ordinary temperatures, which solution is initially of a temperature above the saturation point of the salt, a more concentrated solution thereof which consists in separating said heated salt solution into two portions, cooling one of said portions under conditions which will bring about the crystallization of a portion of its salt constituent and separating the crystallized salt from its mother liquor, then mixing the salt so obtained with the other portion of the original salt solution and heating said portion of the salt solution to a temperature which will effect a solution of the salt so added and result in the formation of a heated solution of increased concentration.

3. The method of claim 1 as applied to the concentration of solutions of potassium and/or ammonium alums.

4. The method of claim 2 as applied to the concentrations of solutions of potassium and/or ammonium alums.

5. In the method of manufacturing basic ammonium and/or potassium alums in which an ore of alumina is treated with a solution of sulphuric acid to extract therefrom its alumina values as a solution of aluminum sulphate, the leach so obtained mixed with a solution of potassium and/or ammonium sulphate to form a solution of a normal potassium and/or ammonium alum and said alum solution heated to a high temperature under corresponding pressure to effect the formation and precipitation therefrom of a basic potassium and/or ammonium alum, the improvement which consists in dividing the alum solution, having a temperature in excess of the saturation point, into two portions, cooling one of said portions to bring about the crystallization of normal alum therefrom, separating said normal alum crystals from the mother liquor, mixing said normal alum crystals with the other divided portion of the normal alum solution while heating said solution so as to maintain it at a temperature which will effect the complete solution of the alum crystals.

FRANK EICHELBERGER.